United States Patent
Su et al.

(10) Patent No.: US 10,181,715 B2
(45) Date of Patent: Jan. 15, 2019

(54) PROTECTION DEVICE AND CIRCUIT PROTECTION APPARATUS CONTAINING THE SAME

(71) Applicant: Polytronics Technology Corp., Hsinchu (TW)

(72) Inventors: Tsungmin Su, Hsinchu (TW); Tongcheng Tsai, Tainan (TW); David Shau Chew Wang, Taipei (TW)

(73) Assignee: Polytronics Technology Corp., Hsinchu (TW)

( * ) Notice: Subject to any disclaimer, the term of this patent is extended or adjusted under 35 U.S.C. 154(b) by 51 days.

(21) Appl. No.: 15/615,340

(22) Filed: Jun. 6, 2017

(65) Prior Publication Data
US 2018/0097352 A1 Apr. 5, 2018

Related U.S. Application Data

(63) Continuation-in-part of application No. 15/285,807, filed on Oct. 5, 2016.

(51) Int. Cl.
| H02H 5/04 | (2006.01) |
| H01C 1/144 | (2006.01) |
| H01C 7/02 | (2006.01) |
| H01C 7/12 | (2006.01) |
| H01C 7/13 | (2006.01) |
| H02H 7/085 | (2006.01) |

(52) U.S. Cl.
CPC ............ *H02H 5/041* (2013.01); *H01C 1/144* (2013.01); *H01C 7/02* (2013.01); *H01C 7/12* (2013.01); *H01C 7/13* (2013.01); *H02H 7/0852* (2013.01)

(58) Field of Classification Search
CPC .......... H02H 3/24; H02H 5/04; H02H 5/041; H02H 7/0852; H01C 1/144; H01C 7/02; H01C 7/12; H01C 7/13; H01H 85/0241; H01H 85/046; H01H 2085/0283; H01H 2207/008; H01H 2231/002
USPC ............................................... 361/86
See application file for complete search history.

(56) References Cited

U.S. PATENT DOCUMENTS

| 6,344,633 B1* | 2/2002 | Furuuchi | H01H 85/463 |
| | | | 219/481 |
| 2006/0215342 A1* | 9/2006 | Montoya | H01C 1/148 |
| | | | 361/103 |

(Continued)

FOREIGN PATENT DOCUMENTS

| TW | 200423174 A | 11/2004 |
| TW | 201427790 A | 7/2014 |
| TW | M512203 U | 11/2015 |

*Primary Examiner* — Kevin J Comber
(74) *Attorney, Agent, or Firm* — Muncy, Geissler, Olds & Lowe, P.C.

(57) ABSTRACT

A protection device comprises a first planar substrate, a second planar substrate, a heating element, a fusible element and an absorbent element. The first substrate comprises a first surface, and the second substrate comprises a second surface facing the first surface. The heating element is disposed on the first surface, and the fusible element is disposed above the heating element. The absorbent element is disposed on the second surface and above the fusible element. When over-current or over-temperature occurs, the heating element heats up to melt and blow the fusible element and the absorbent element absorbs melted metal of the fusible element.

15 Claims, 6 Drawing Sheets

(56) References Cited

U.S. PATENT DOCUMENTS

2012/0001720 A1* 1/2012 Kimura ................ H01H 37/761
  337/297
2014/0340046 A1* 11/2014 Komori .................. H01M 2/34
  320/134

* cited by examiner

PROTECTION DEVICE AND CIRCUIT PROTECTION APPARATUS CONTAINING THE SAME

CROSS-REFERENCE TO A RELATED APPLICATION

This application is a Continuation-in-Part of co-pending Application Ser. No. 15/285,807, filed on Oct. 5, 2016, for which priority is claimed under 35 U.S.C. § 120; the entire contents of all of which are hereby incorporated by reference.

BACKGROUND OF THE INVENTION

(1) Field of the Invention

The present application relates to a protection device and a circuit protection apparatus containing the same. More specifically, it relates to a protection device and a circuit protection apparatus capable of preventing over-voltage, over-current and/or over-temperature.

(2) Description of the Related Art

Fuses containing low-melting metals, e.g., lead, tin or antimony, are well-known protection devices to cut off currents. To prevent over-current and over-voltage, various protection devices are continuously developed. For example, a device containing a substrate on which a heating layer and a low-melting metal layer are stacked in sequence. The heating layer heats up in the event of over-voltage, and then the heat is transferred upwards to the low-melting metal layer. As a result, the low-melting metal layer is melted and blown to sever currents flowing therethrough, so as to protect circuits or electronic apparatuses.

Recently, mobile apparatuses such as cellular phones and laptop computers are widely used, and people increasingly rely on such products over time. However, burnout or explosion of batteries of cellular phones or portable products during charging or discharging is often seen. Therefore, the manufacturers continuously improve the designs of over-current and over-voltage protection devices to prevent the batteries from being blown due to over-current or over-voltage during charging or discharging.

In a know protection device, the low-melting metal layer is in series connection to a power line of a battery, and the low-melting metal layer and a heating layer are electrically coupled to a switch and an integrated circuit (IC) device. When the IC device detects an over-voltage event, the IC device enables the switch to "on". As a result, current flows through the heating layer to generate heat to melt and blow the low-melting metal layer, so as to sever the power line to the battery for over-voltage protection. Moreover, it can be easily understood that the low-melting metal layer, e.g., fuses, can be heated and blown by a large amount of current in the event of over-current, and therefore over-current protection can be achieved also.

Figure 1:
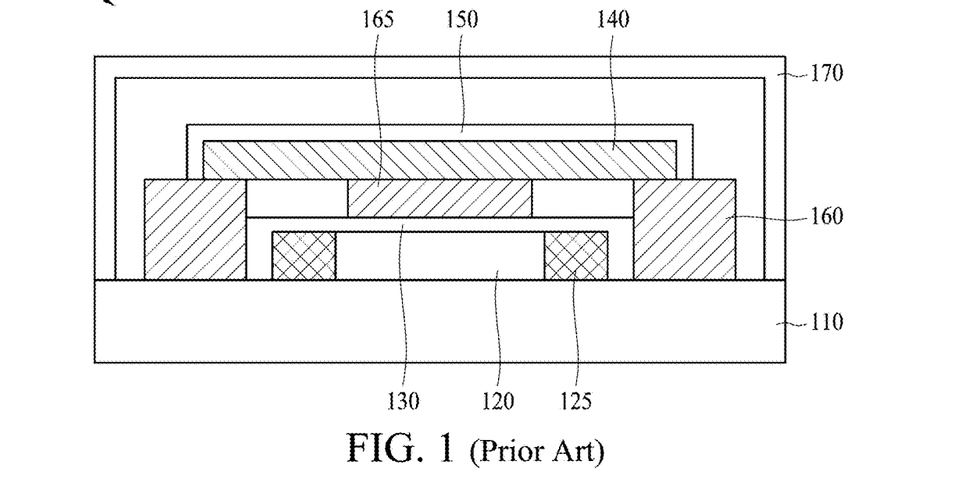
FIG. 1 shows a known protection device.

FIG. 1 shows a known cross-sectional view of a protection device implementing the above-mentioned protection mechanism. A protection device 100 comprises a substrate 110, a heating element 120, an insulating layer 130, a low-melting metal layer 140, a flux 150 and a housing 170. The housing 170 is placed on the substrate 110 and has an internal space to receive the heating element 120, the insulating layer 130, the low-melting metal layer 140 and the flux 150. The heating element 120 is disposed on the substrate 110 and electrically connects to two heating element electrodes 125. The low-melting metal layer 140 connects to electrodes 160 at two sides and an intermediate electrode 165 in the middle. The insulating layer 130 covers the heating element 120 and the heating element electrodes 125. The low-melting metal layer 140 is disposed above the insulating layer 130 to be a fuse, and is overlaid by the flux 150. As a result, the heating element 120 heats up to melt the low-melting metal layer 140, and then the low-melting metal layer 140 flows to the two electrodes 160 and the intermediate electrode 165. More specifically, the two electrodes 160 and the intermediate electrode 165 accumulate the melted metal of the low-melting metal layer 140, resulting in that the low-melting metal layer 140 is divided into three pieces to cut off the current flowing through it for protection. Because the three electrodes 160 and 165 are disposed below the low-melting metal layer 140, the upper surface of the low-melting metal layer 140 would be exposed to atmosphere. Although the flux 150 such as rosin are provided on the low-melting metal layer 140 for protection, the rosin at a high temperature would flow or volatilize to diminish protection functionality. Therefore, an oxidation film that would be formed on the low-melting metal layer 140 during melting at a high temperature hinders accumulation of melting metal to the three electrodes 160 and 165. As a result, the low-melting metal layer 140 is not easily blown to interrupt current, inducing inaccurate melting time, i.e., fuse opening time.

With miniaturization of mobile electronic apparatuses, thin devices to be used in the apparatuses are demanded. The housing 170 of the protection device 100 has a certain height to receive the internal components, thus the height of the housing 170 is not easily decreased to meet the requirement of thin protection devices. Besides, the housing 170 usually is formed by injection molding and it is costly to make a mold. Therefore, it is hard to lower manufacturing expense for the design of the protection device 100.

SUMMARY OF THE INVENTION

The present application provides a protection device and a circuit protection apparatus containing the same for over-current, over-voltage and/or over-temperature protection. It is advantageous to make a thin protection device in accordance with the present application, so as to meet the requirement of miniaturization.

In accordance with a first aspect of the present application, a protection device comprises a first planar substrate, a second planar substrate, a heating element, a fusible element and an absorbent element. The first planar substrate comprises a first surface, and the second planar substrate comprises a second surface facing the first surface. The heating element is disposed on the first surface of the first planar substrate, and the fusible element is disposed above the heating element. The absorbent element is disposed on the second surface and above the fusible element. When over-current or over-temperature occurs, the heating element heats up to melt and blow the fusible element and the absorbent element absorbs melted metal of the fusible element.

In an embodiment, the fusible element is melted and is absorbed upwards and downwards when the fusible element is blown.

In an embodiment, the protection device further comprises an insulating frame disposed on the second surface to accumulate flux on the top of the fusible element.

In an embodiment, the insulating frame comprises an outer frame and an inner frame. The inner frame confines the flux, and the outer frame confines glue or posts which connect the first planar substrate and the second planar substrate.

In an embodiment, there is a gap between the fusible element and the absorbent element, and the gap is able to incur absorption.

In an embodiment, the gap is filled with solder to connect the fusible element and the absorbent element.

In an embodiment, the protection device has a thickness ranging from 0.2-2 mm.

In an embodiment, the protection device further comprises an insulting layer between the fusible element and the heating element for isolation.

In an embodiment, the protection device further comprises a first electrode and a second electrode on the first surface, and the fusible element connects to the first electrode and the second electrode at two ends.

In an embodiment, the protection device further comprises a third electrode and a fourth electrode, and the third electrode and the fourth electrode connect to two ends of the heating element.

In an embodiment, the heating element is of a rectangular shape, and the third electrode and the fourth electrode connect to two longitudinal ends of the heating element.

In an embodiment, the protection device further comprises an electrode layer which connects to a middle portion of the underside of the fusible element and electrically connects to the third electrode.

In an embodiment, the protection device has an equivalent circuit in which the fusible element comprises two fuses, and the heating element comprises a heater, e.g., a resistor.

In accordance with a second aspect of the present application, a circuit protection apparatus comprises the aforementioned protection device associated with a detector and a switch. The detector is adapted to detect voltage drops or temperatures of a circuit to be protected, and the switch is coupled to the detector to receive its sensing signals. When a voltage drop or a temperature exceeds a threshold value, the switch turns on to allow current to flow through the heating element by which the heating element heats up to melt and blow the fusible element and the absorbent element absorbs melted metal of the fusible element.

In an embodiment, the fusible element is melted and is absorbed upwards and downwards when the fusible element is blown.

In an embodiment, the detector and the switch are placed on the first surface of the first planar substrate.

In the aforesaid embodiments, in addition to three electrodes disposed below the fusible element to absorb melted low-melting metal, unlike prior arts, an absorbent element disposed on or above the fusible element is able to upwards absorb the low-melting metal. When the heating element heats up, the low-melting metal of the fusible element melts and is absorbed upwards by the absorbent element and is absorbed downwards by the three electrodes. Therefore, an oxidization layer is not easily formed on the fusible element, and the fusible element can be blown effectively. In accordance with the present application, both the upper absorbent element and the three lower electrodes absorb the melted low-melting metal of the fusible element to overcome the problem of inaccurate melting time of the low-melting metal layer in the prior arts.

The protection device of the present application can be made by printing processes to obtain a very thin structure to meet the demands of miniaturization and thinning tendency. Because injection molding is not used in the processes of the present application, the molding expense can be saved. In terms of process, the protection device may be a combination of the first planar substrate and the second planar substrate on which members can be made individually and simultaneously to improve manufacturing throughput. One more advantage is that the defective ones of semi-finished first planar substrate and second planar substrate can be removed before completion of the protection device so as to diminish the loss of scrapped defective products. Compared to the prior arts, the melting times, i.e., fuse opening times, of the protection devices of the present application are more concentrated (smaller standard deviation), indicating better stability of quality.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 2:
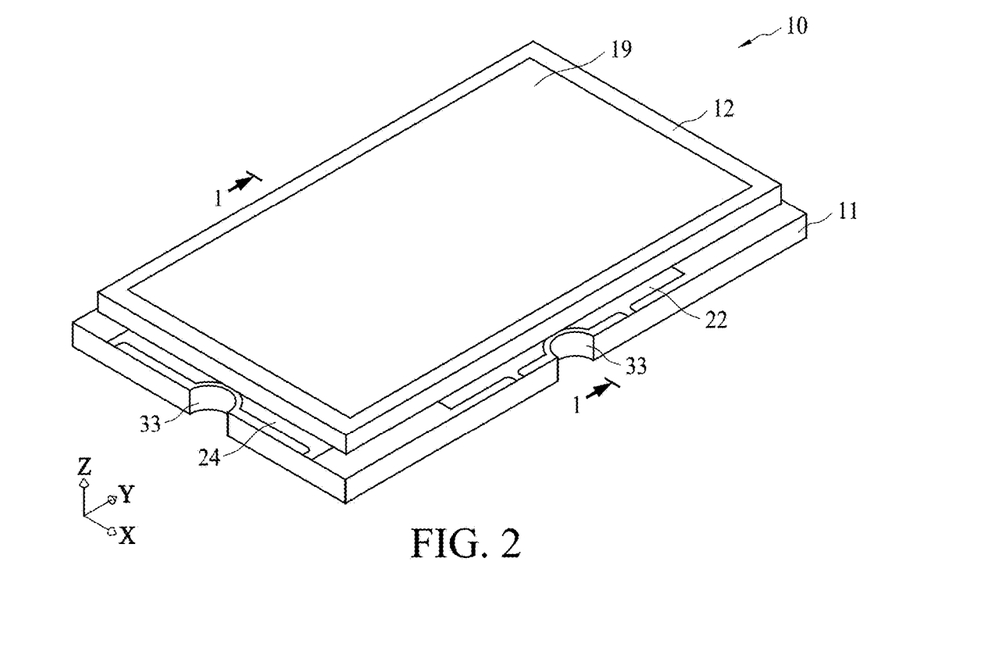
FIG. 2 shows a protection device in accordance with an embodiment of the present application.
Figure 3A:
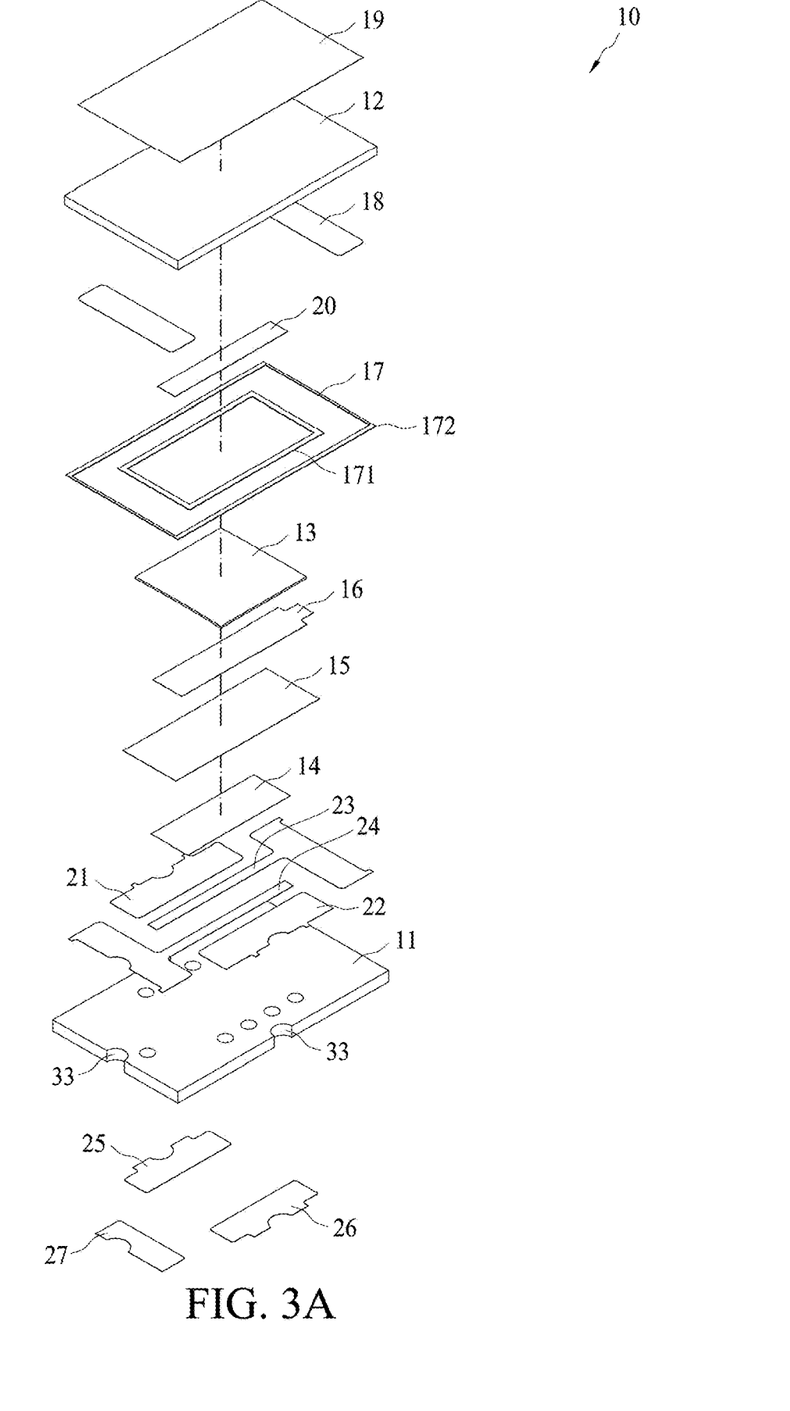
FIG. 3A shows an exploded view of the protection device in accordance with an embodiment of the present application.
Figure 4:
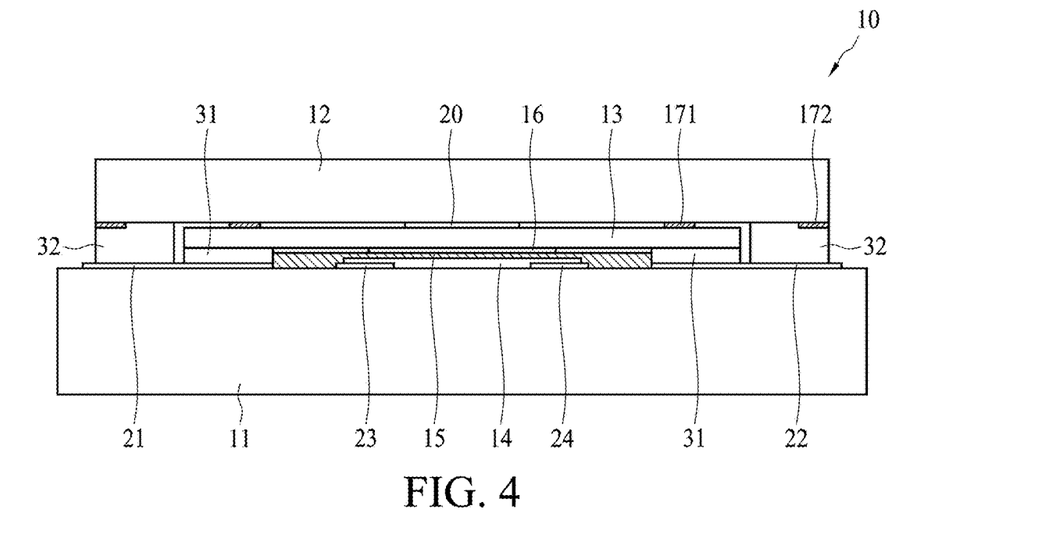
FIG. 4 shows a cross-sectional view of the protection device along line 1-1 of FIG. 2.

FIG. 2 shows a protection device in accordance with an embodiment of the present application. FIG. 3A shows an exploded view of the protection device 10. FIG. 4 shows a cross-sectional view of the protection device 10 along line 1-1 in FIG. 2. The protection device 10 comprises a first planar substrate 11, a second planar substrate 12, a fusible element 13, a heating element 14, an insulating layer 15, an electrode layer 16, an insulating frame 17, silver adhesive 18, a protective layer 19, an absorbent element 20, a first electrode 21, a second electrode 22, a third electrode 23, a fourth electrode 24, bonding pads 25, 26 and 27. For the ease of understanding, the members in FIG. 2, FIG. 3A and FIG. 4 are not fully correspondent. For example, the protective layer 19, the bonding pads 25, 26 and 27 in FIG. 2 are omitted in FIG. 4. Preferably, the protection device 10 may use the first planar substrate 11 and the second planar substrate 12 as two bases to form members thereon, and then they are combined to form the protection device 10. The first electrode 21, the second electrode 22, the third electrode 23 and the fourth electrode 24 are formed on an upper surface (first surface) of the first planar substrate 11 by printing. The four electrodes are usually formed at the same time and have the same thickness or the same height. The third electrode 23 and the fourth electrode 24 are in the shape as "T", and each of them comprises a strip portion and an end portion. The strip portions are between the first electrode 21 and the second electrode 22. The heating element 14 is formed thereafter, and connects to the third electrode 23 and the fourth electrode 24 at two ends for electrical conduction. In an embodiment, the heating element 14 is formed by printing and may fill the gap between the third electrode 23 and the fourth electrode 24. The third electrode 23, the fourth electrode 24 and the heating element 14 are overlaid by the insulating layer 15. The electrode layer 16 is formed on the center of the insulating layer 15, and then solder is printed to adhere to the fusible element 13. The electrode layer 16 connects to a middle portion of the underside of the fusible element 13. The fusible element 13 stretches across and connects to the first electrode 21, the electrode layer 16 and the second electrode 22 for electrical conduction. The gap between the fusible element 13 and the insulating layer 15 may be filled with an insulating material to support the fusible element 13 and avoid deformation of the fusible element 13. The strip portion of the third electrode 23 connects to an end of the heating element 14, and the end portion of the third electrode 23 electrically connects to the electrode layer 16. The electrode layer 16 corresponds to the center of the fusible element 13 as an intermediate electrode of the fusible element 13. When the fusible element 13 melts, the melted low-melting metal of the fusible element 13 is absorbed downwards to the first electrode 21, the electrode layer 16 and the second electrode 22 due to alloy absorption phenomenon at a high temperature. In an embodiment, the fusible element 13 may connect to the first electrode 21, the electrode layer 16 and the second electrode 22 by solder 31. The insulating frame 17 is disposed on the fusible element 13, and more specifically it is disposed on the lower surface (second surface) of second planar substrate 12. The insulating frame 17 comprises an inner frame 171 and an outer frame 172 to accumulate flux on top of the fusible element 13. In an embodiment, the inner frame 171 and the outer frame 172 are, but not limited to, rectangular shapes, and the inner frame 171 is enclosed by the outer frame 172. The absorbent element 20 is disposed on the lower surface of the second planar substrate 12 by silver adhesive printing or electroplating, and may be enclosed by the inner frame 171. The absorbent element 20 is placed on top of the center of the fusible element 13 to absorb the fusible element 13 from above when it is melted to increase blowing efficiency. The first planar substrate 11 and the second planar substrate 12 may be combined by glue or posts 32 made by silver adhesive and solder paste to increase structural strength. Elongated silver adhesive 18 is placed at two opposite sides of the lower surface of the second planar substrate 12 and adapted to fix and connect the first planar substrate 11 and the second planar substrate 12. However, the silver adhesive 18 and the posts 32 can be omitted if the structure is strong enough. In particular, the inner frame 171 accumulates flux, and the outer frame 172 confines the glue or posts 32 between the first planar substrate 11 and the second planar substrate 12. The inner frame 171 and the outer frame 172 may be made by printing to be thin. In an embodiment, the thicknesses of the inner frame 171 and the outer frame 172 are equal to or greater than the thickness of the absorbent element 20. The inner frame 171 may be in direct contact with the upper surface of the fusible element 13. The second planar substrate 12 may be overlaid by a protection layer 19 which may be made of glass or glaze. A marking for the protection device 10 may be formed on the protection layer 19. The sidewalls of the first planar substrate 11 corresponding to the first electrode 21, the second electrode 22 and the fourth electrode 24 are provided with semi-circular holes which may be plated with conductive films to form conductive holes 33. The conductive holes 33 are placed at three different sidewalls of the first planar substrate 11. Bonding pads 25, 26 and 27 are placed on the underside of the first planar substrate 11 as interfaces for bonding the protection device 10 to a circuit board. More specifically, a conductive hole 33 electrically connects the first electrode 21 and the bonding pad 25, another conductive hole 33 electrically connects the second electrode 22 and the bonding pad 26, and yet another conductive hole 33 electrically connects the fourth electrode 24 and the bonding pad 27.

Figure 3B:
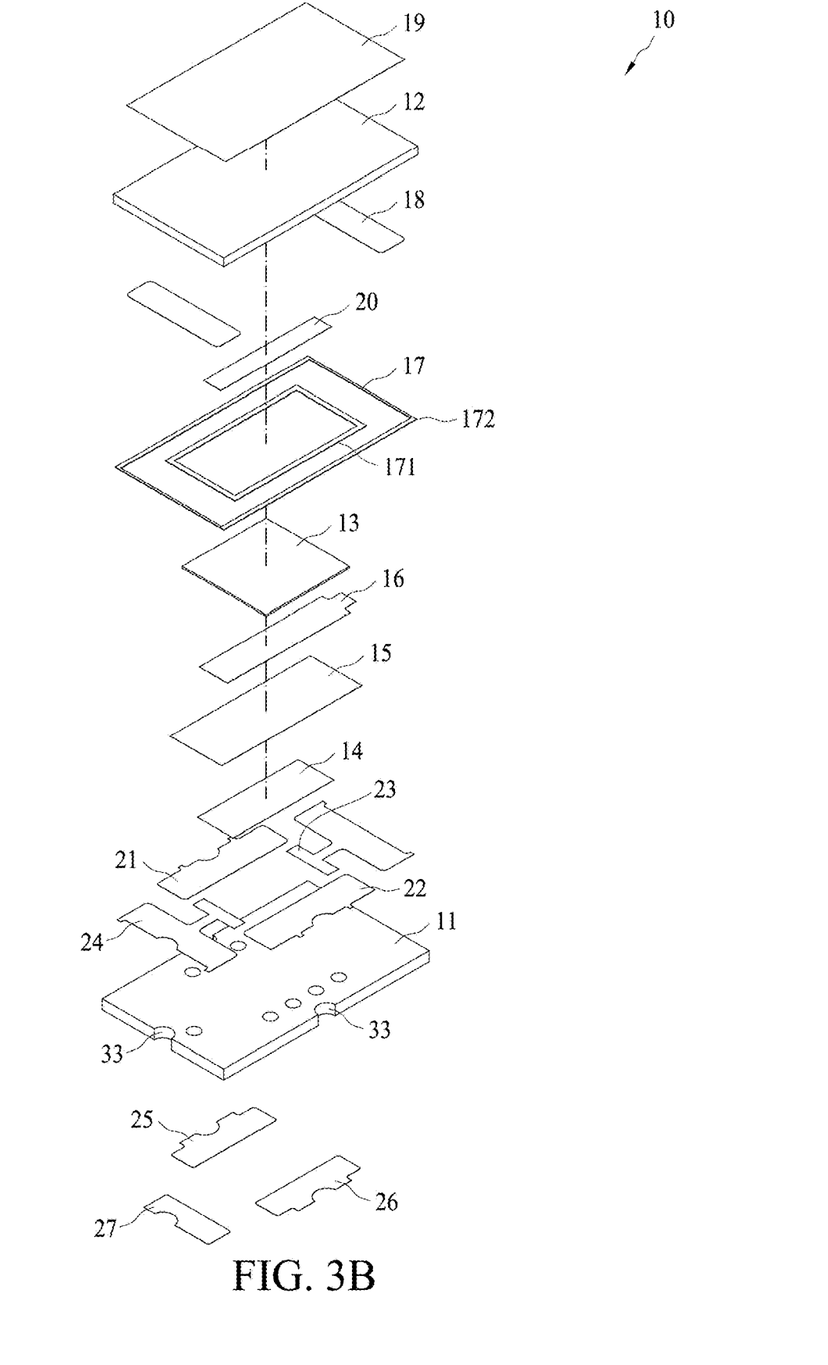
FIG. 3B shows an exploded view of the protection device in accordance with another embodiment of the present application.
Figure 3C:
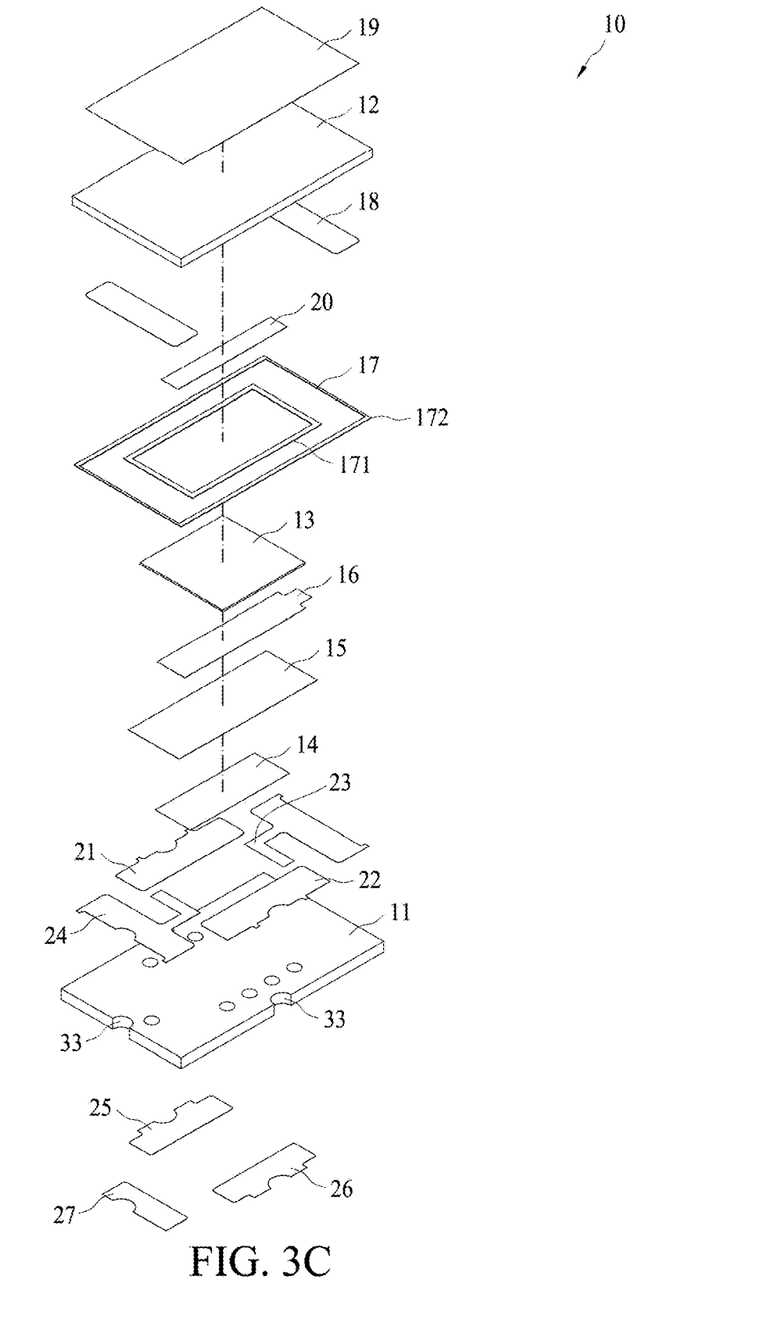
FIG. 3C shows an exploded view of the protection device in accordance with yet another embodiment of the present application.

In addition to that shown in FIG. 3A, the third electrode 23 and the fourth electrode 24 may be of different shapes as shown in FIG. 3B and FIG. 3C. In FIG. 3A, the heating element 14 connect to the strip portions of the third electrode 23 and the fourth electrode 24 extending in a longitudinal direction. In FIG. 3B and FIG. 3C, the heating element 14 connects to the portions of the third electrode 23 and the fourth electrode 24 extending in a traverse direction, so that the third electrode 23 and the fourth electrode 24 connect to two longitudinal ends of the heating element 14. Because the heating element 14 is of a rectangular shape, the heating element 14 in FIG. 3B or FIG. 3C has larger resistance and current will flow in a longitudinal direction of the heating element 14 with a longer path. If more cells connected in series in a battery to be protected, a higher operation voltage is needed. Therefore, a heating element 14 of a large resistance is demanded to sustain power stability. The designs of FIG. 3B and FIG. 3C are suitable for such applications. Alternatively, the heating element 14 may use low resistance material to adapt to a longer current path to obtain an equivalent resistance.

In summary, a protection device 10 comprises a first planar substrate 11, a second planar substrate 12, a heating element 14, a fusible element 13 and an absorbent element 20. The upper surface (first surface) of the first planar substrate 11 faces the lower surface (second surface) of the second planar substrate 12. The heating element 14 is disposed on the first surface, and the fusible element 13 is disposed above the heating element 14. The absorbent element 20 is disposed on the second surface and above the fusible element 13. When over-current or over-temperature occurs, the heating element 14 heats up to melt and blow the fusible element 13 and the absorbent element 20 upwards absorbs melted metal of the fusible element 13. Moreover, the first electrode 21 and the second electrode 22 below the fusible element 13 absorb the melted metal of the fusible element 13 downwards. Accordingly, the fusible element 13 is absorbed upwards and downwards concurrently when it is melted.

In an embodiment, the first planar substrate 11 and the second planar substrate 12 may be a rectangular insulating substrate including aluminum oxide, aluminum nitride, zirconium oxide and/or heat-resistant glass. The first electrode 21, the second electrode 22, the third electrode 23 and the fourth electrode 24 may comprise silver, gold, copper, tin, nickel or other conductive metals, and its thickness is approximately 0.005-1 mm, or 0.01 mm, 0.05 mm, 0.1 mm, 0.3 mm or 0.5 mm in particular. In addition to making the electrodes by printing, they may be alternatively made of metal sheets for high-voltage applications. The fusible element 13 may comprise low-melting metal or its alloy, e.g., Sn—Pb—Ag, Sn—Ag, Sn—Sb, Sn—Zn, Zn—Al, Sn—Ag—Cu, Sn. The length and width of the fusible element 13 vary according to the designated current flowing therethrough, but they cannot exceed the lengths and widths of the first planar substrate 11 and the second planar substrate 12. The thickness of the fusible element 13 is 0.005-1 mm, preferably 0.01-0.5 mm, and most preferably 0.02-0.2 mm, or 0.05 mm, 0.1 mm, 0.3 mm in particular. A thicker fusible element 13 can be used for the applications of a large current such as 30-100 A. The heating element 14 may comprise ruthenium oxide ($RuO_2$) with additives of silver (Ag), palladium (Pd), and/or platinum (Pt). The insulating layer 15 between the heating element 14 and the fusible element 13 may contain glass, epoxy, aluminum oxide, silicone or glaze. The absorbent element 20 may be made by printing or electroplating. The absorbent element 20 may comprise a single member or multiple members in various shapes such as a strip, a block, a spot or a curve. The composition of the absorbent element 20 may comprise silver, gold, copper, nickel, tin, lead, antimony, or alloy thereof, and may be in the form of a single layer or multiple layers.

As mentioned above, the heating element 14 and the electrodes 21, 22, 23 and 24 may be formed on the first planar substrate 11 by thick-film printing. Likewise, the insulating frame 17 and the absorbent element 20 may be formed on the second planar substrate 12 by printing as well. After completing the members on the first planar substrate 11 and the second planar substrate 12, they are combined to form the protection device 10. Because primary members of the protection device 10 can be made by printing and a housing is not needed, a thin protection device 10 can be obtained. Because device members are formed on different planar substrates, manufacturing complexity can be reduced. In an embodiment, the area of the second planar substrate 12 may be slightly smaller than that of the first planar substrate 11, so that the second planar substrate 12 can be easily put in a fixture to combine with the first planar substrate 11. Because the members on the first planar substrate 11 and the second planar substrate 12 are made individually, it is advantageous to individually remove defective products of semi-finished planar substrate 11 and/or 12 and thereby increasing yield of the protection device 10 and decreasing manufacturing cost. Nevertheless, the present application is not limited to individually make the first planar substrate 11 and the second planar substrate 12, any protection devices with aforesaid specific structures should be covered by the scope of the present application.

The absorbent element 20 may be in direct contact with the fusible element 13 or be distanced from the fusible element 13 by a gap which is able to incur absorption. In an embodiment, the gap does not exceed 1.5 mm, 1 mm or 0.5 mm and may be filled with solder. The absorbent element 20 together with solder formed thereon upwards absorbs melted metal of the fusible element 13 to avoid uncontrolled melting flow. The gap may be filled with rosin, soft metal or flux instead of solder as long as they can from above absorb and accumulate the melted metal of the fusible element 13. The heating element 14 is located in a place corresponding to the fusible element 13, and therefore the heat generated by the heating element 14 can be effectively transferred to the fusible element 13 so as to melt or blow the fusible element 13.

It should be noted that an overheated second planar substrate 12 may have cracks when the fusible element 13 melts. To overcome this problem, an upper surface of the second planar substrate 12, i.e., another surface opposite to the second surface, may be provided with a thermal conductive layer, e.g., a printed silver layer, with a heat conductivity greater than 50 W/m·K or 100 W/m·K to increase heat dissipation and thereby avoiding cracks of the second planar substrate 12. Sequentially, an insulating layer, e.g., a glaze layer, may be formed on the silver layer to prevent unexpected short circuits.

Because the primary members of the protection device 10 can be made by printing technology, it is advantageous to decrease the thicknesses of the heating element 14 and the electrodes 21, 22, 23 and 24. The distance between the first planar substrate 11 and the second planar substrate 12 is about 0.03-1.5 mm, preferably 0.04-1 mm, and most preferably 0.05-5 mm, or 0.1 mm, 0.3 mm, 0.7 mm, 1.2 mm in particular. Accordingly, further adding the thickness of first and second planar substrates 11 and 12, the protection device 10 has a thickness of 0.2-2 mm, preferably 0.4-1.5 mm and most preferably 0.5-1 mm, or 0.3 mm, 0.7 mm, 1.3 mm in particular. It appears that a thin protection device 10 can be effectively obtained. The fusible element 13 and the heating element 14 vary the resistances upon their dimensions. The fusible element 13 of low resistance and the heating element 14 of high resistance can be made accordingly, so as to produce the high-efficiency protection device 10.

Figure 5:
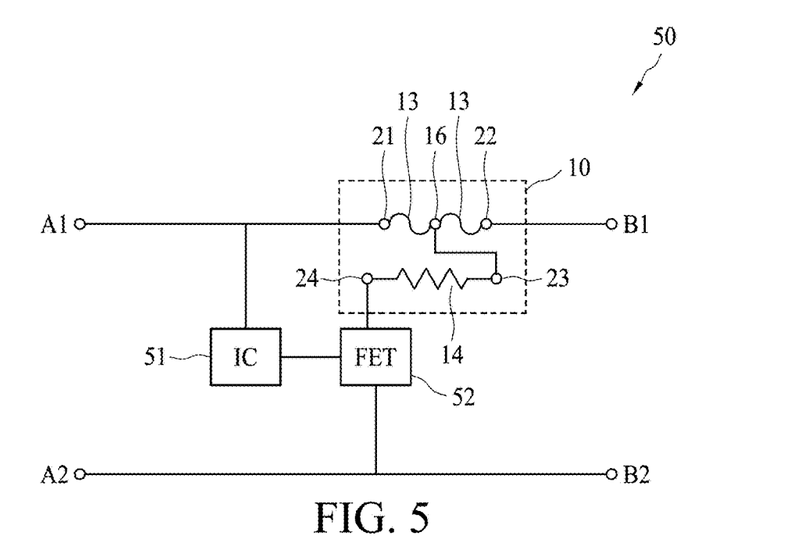
FIG. 5 shows a circuit diagram of a circuit protection apparatus in accordance with an embodiment of the present application.

The equivalent circuit diagram of the protection device 10 of this embodiment is depicted in a dashed-line block in FIG. 5. The first electrode 21 connects to a terminal A1 of an apparatus to be protected such as a secondary battery or a motor, whereas the second electrode 22 connects to a terminal B1 of a charger or the like. The third electrode 23 connects to the heating element 14 and the electrode layer 16. Another end of the heating element 14 connects to the fourth electrode 24. According to this circuit design of the protection device 10, the fusible element 13 forms a circuit containing two fuses in series connection, and the heating element 14 forms a heater denoted by a resistor. In an embodiment, the fourth electrode 24 electrically connects to a switch 52, e.g., a field-effect transistor (FET). The gate electrode of the switch 52 connects to a detector 51, a terminal A2 of the apparatus to be protected, and a terminal B2 of the charger. The detector 51 may be an IC device capable of sensing voltage drops and temperatures of the circuit. If no over-voltage and over-temperature event, the switch 52 is off, current flows through fusible element 13 and no current flows through the heating element 14. If over-current occurs, the fusible element 13 is blown to provide over-current protection. When the detector 51 senses a voltage or a temperature larger than a threshold value, i.e., over-voltage or over-temperature, the switch 52 turns on to allow current to flow through the source and drain electrodes of the switch 52 and the heating element 14, and accordingly the heating element 14 heats up to blow the fusible element 13 to provide over-voltage and over-temperature protections. In summary, two power lines of B1 to A1 and B2 to A2 supply power to the circuit to be protected. The protection device 10, the detector 51 and the switch 52 are coupled to the two power lines to form a circuit protection apparatus 50. If the detector 51 senses a voltage drop or a temperature over a threshold value, then the heating element 14 is activated to blow the fusible element 13. In an embodiment, the first planar substrate 11 may be made to be larger than the second planar substrate 12, for example, the first planar substrate 11 in FIG. 4 further extend horizontally. The extended portions of the first planar substrate 11 can carry the detector 51 and the switch 52 to form a module.

Figure 6:
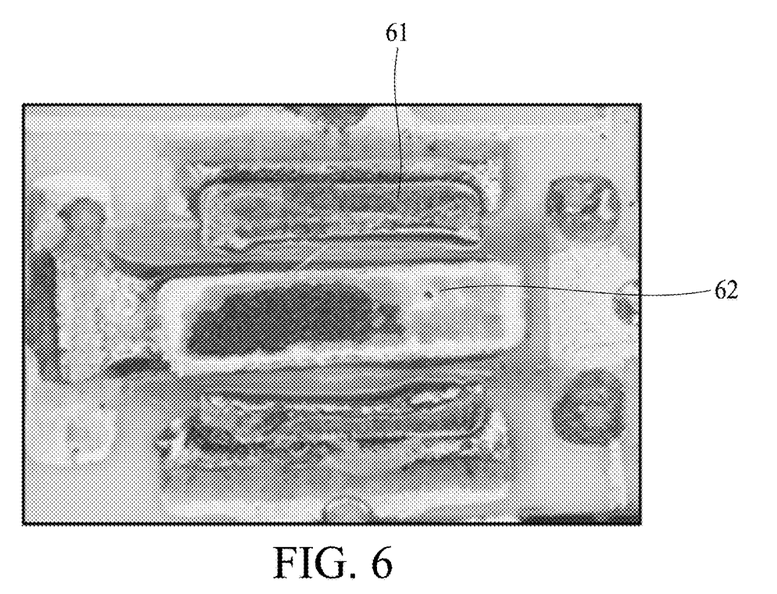
FIG. 6 shows a protection device of the present application after the fusible element is blown.
Figure 7:
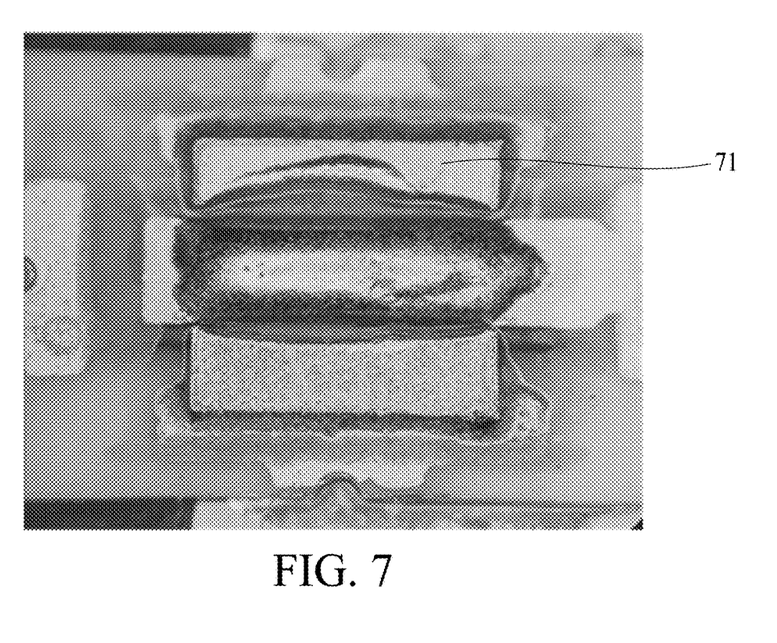
FIG. 7 shows a known protection device after the fusible element is blown.

The protection device 10 of the present application and the traditional protection device 100 shown in FIG. 1 of same specification undergo blowout tests. The resistance of the fusible element is about 0.0012Ω, the resistance of the heating element is about 24Ω, and the supply voltage is 42V. The fusible elements after blowout are shown in FIG. 6 and FIG. 7. In FIG. 6, the fusible element 61 of the protection device of the present application is separated into two portions with a manifest separation. It appears that the fusible element 61 can be blown completely. The absorbent element 62 is approximately placed at a center of the separation between the upper and lower portions of the fusible element 61. In FIG. 7, the fusible element 71 of the traditional protection device is blown too; however, the separation is relatively small. It indicates the protection device of the present application has better blowout efficiency. In the present application, the absorbent element 62 disposed above the fusible element 61 is able to absorb the fusible element 61 when it melts, so as to timely blow the fusible element 61 with a large separation. In a blowout test with 10 specimens, the standard deviation of the melting times of the protection devices of the present application is 0.783 seconds, and the standard deviation of the melting times of the traditional protection devices is 1.652 seconds. The standard deviations are obtained upon calculation according to the formula (1) below:

$$\sqrt{\frac{\sum (x - \bar{x})^2}{n}} ; \quad (1)$$

where x is the melting time of each of the specimens, $\bar{x}$ is the mean value of x, and n is the number of specimens. It is advantageous that the protection device of the present application exhibits more concentrated melting time distribution than the traditional protection device.

Moreover, the protection devices 10 of the present application are subjected to blowout tests in which supply voltages are 18.4-60V. The currents, voltages and melting times of the protection devices are shown in Table 1. At a supply voltage of 56V, the power is about 132 W. At 60V, it is found that the second planar substrate 12 has cracks which may be caused by the heat concentrated in a portion cannot dissipate efficiently.

TABLE 1

| | Heating element (Ω) | Fusible element (Ω) | Supply voltage (V) | Current (A) | Voltage (V) | Power (W) | Melting time(s) | Crack on substrate |
|---|---|---|---|---|---|---|---|---|
| 1 | 23.74 | 0.0012 | 60 | — | — | — | — | Yes |
| 2 | 22.74 | 0.0012 | 56 | 2.34 | 56.68 | 132.63 | 0.13 | No |
| 3 | 22.70 | 0.0012 | 56 | 2.30 | 55.69 | 128.09 | 0.12 | No |
| 4 | 24.77 | 0.0011 | 56 | 2.10 | 56.09 | 117.79 | 0.22 | No |
| 5 | 22.80 | 0.0012 | 56 | 2.29 | 56.09 | 128.45 | 0.08 | No |
| 6 | 23.66 | 0.0012 | 46 | 1.81 | 45.44 | 82.25 | 0.34 | No |
| 7 | 23.31 | 0.0012 | 46 | 1.85 | 45.64 | 84.43 | 0.23 | No |
| 8 | 22.00 | 0.0012 | 46 | 1.91 | 45.59 | 87.08 | 0.23 | No |
| 9 | 24.07 | 0.0011 | 42 | 1.69 | 41.70 | 70.47 | 1.11 | No |
| 10 | 23.66 | 0.0012 | 42 | 1.67 | 41.77 | 69.76 | 1.07 | No |
| 11 | 23.31 | 0.0012 | 42 | 1.69 | 41.70 | 70.47 | 1.03 | No |
| 12 | 22.00 | 0.0011 | 20.4 | 0.96 | 20.22 | 19.41 | 9.48 | No |
| 13 | 22.74 | 0.0011 | 20.4 | 0.91 | 20.24 | 18.42 | 9.10 | No |
| 14 | 22.70 | 0.0012 | 20.4 | 0.95 | 20.19 | 19.18 | 8.67 | No |
| 15 | 22.77 | 0.0012 | 18.4 | 0.83 | 18.20 | 15.11 | 30.22 | No |
| 16 | 22.80 | 0.0012 | 18.4 | 0.81 | 18.19 | 14.73 | 29.13 | No |
| 17 | 23.23 | 0.0012 | 18.4 | 0.80 | 18.12 | 14.50 | 27.21 | No |

Likewise, the traditional protection devices 100 are subjected to blowout tests in which supply voltages are 18.4-56V. The currents, voltages and melting times of the devices are shown in Table 2. In Table 2, the protection devices withstand a supply voltage of at most 46V and a power of about 77 W. At 56V, it is found that the housing has cracks. Because the housing encloses the inner members on the substrate, heat cannot be dissipated effectively. Therefore, the housing is easily cracked due to overheat, and the voltage and power endurances of traditional protection device are worse than that of the present application.

TABLE 2

| | Heating element (Ω) | Fusible element (Ω) | Supply voltage (V) | Current (A) | Voltage (V) | Power (W) | Melting time(s) | Crack on housing |
|---|---|---|---|---|---|---|---|---|
| 1 | 22.56 | 0.0012 | 56 | — | — | — | — | Yes |
| 2 | 23.66 | 0.0012 | 46 | 1.71 | 45.14 | 77.19 | 0.46 | No |
| 3 | 23.31 | 0.0012 | 46 | 1.75 | 45.31 | 79.29 | 0.38 | No |

TABLE 2-continued

| Heating element (Ω) | Fusible element (Ω) | Supply voltage (V) | Current (A) | Voltage (V) | Power (W) | Melting time(s) | Crack on housing |
|---|---|---|---|---|---|---|---|
| 4 | 22.00 | 0.0012 | 46 | 1.76 | 45.29 | 79.71 | 0.43 | No |
| 5 | 24.85 | 0.0011 | 43 | 1.65 | 42.55 | 70.21 | 1.16 | No |
| 6 | 25.25 | 0.0011 | 42 | 1.56 | 41.66 | 64.99 | 1.28 | No |
| 7 | 24.49 | 0.0012 | 42 | 1.65 | 41.65 | 68.72 | 1.22 | No |
| 8 | 23.89 | 0.0011 | 42 | 1.69 | 41.70 | 70.47 | 1.21 | No |
| 9 | 23.97 | 0.0012 | 32 | 1.29 | 31.77 | 40.98 | 2.47 | No |
| 10 | 23.34 | 0.0012 | 32 | 1.31 | 31.40 | 41.13 | 2.31 | No |
| 11 | 23.66 | 0.0011 | 20 | 0.84 | 20.40 | 17.14 | 13.83 | No |
| 12 | 24.49 | 0.0011 | 20 | 0.82 | 20.48 | 16.79 | 16.19 | No |
| 13 | 24.38 | 0.0012 | 18.4 | 0.73 | 18.21 | 13.29 | 43.98 | No |
| 14 | 24.32 | 0.0012 | 18.4 | 0.73 | 18.20 | 13.29 | 48.52 | No |
| 15 | 24.14 | 0.0012 | 18.4 | 0.73 | 18.19 | 13.28 | 31.60 | No |
| 16 | 24.48 | 0.0011 | 18.4 | 0.72 | 18.12 | 13.05 | 34.45 | No |

Table 1 and Table 2 show a blowout test comparison for protection devices of a specific specification. It does not indicate that the protection devices of the present application of another specification will have cracked substrates at a supply voltage of 60V. In practice, the protection device of another specification of the present application is able to withstand a voltage of 70V, or would be used for higher power applications.

The equivalent circuit diagrams of the protection devices of the aforesaid embodiments comprise two fuses and a heater. Nevertheless, variant designs in structure or circuit may be used to form a protection device containing two fuses and two heaters, or one fuse and one heater, which are also covered by the scope of the present application. In an embodiment, the fusible element may electrically connect to two bonding pads to form a current path and the heating element electrically connect to another two bonding pads to form another current path, so as to independently control the current flowing through the heating element to blow the fusible element.

The issues of inefficient blowing and inaccurate melting time of the traditional protection device can be overcome by the present application. In addition to downward absorption, the melted metal of the fusible element is absorbed upwards by the absorbent element due to alloy absorption phenomenon at a high temperature. This prevents the formation of an oxidation layer on the fusible element to facilitate blow-out of the fusible element.

The present application fully takes advantage of printing technology to make a very thin protection device to meet the requirements of miniaturization and thinning tendencies. Without the use of injection molding, the process can be simplified and the molding expense can be saved. Compared to the prior art, the melting times of the protection devices of the present application are more concentrated (smaller standard deviation) to achieve superior stability of quality.

The above-described embodiments of the present invention are intended to be illustrative only. Numerous alternative embodiments may be devised by persons skilled in the art without departing from the scope of the following claims.

What is claimed is:

1. A protection device, comprising:
   a first planar substrate comprising a first surface;
   a second planar substrate comprising a second surface facing the first surface;
   a heating element disposed on the first surface;
   a fusible element disposed above the heating element;
   a first electrode and a second electrode disposed on the first surface and on a same plane with the heating element, and the fusible element electrically connecting to the first electrode and the second electrode at two ends; and
   an absorbent element disposed on the second surface and above the fusible element;
   wherein the first planar substrate and the second planar substrate are combined by posts made by silver adhesive and solder paste, and the posts made by silver adhesive and solder paste are in direct contact with the second surface;
   wherein the heating element heats up to melt and blow the fusible element and the absorbent element absorbs melted metal of the fusible element in the event of over-current or over-temperature.

2. The protection device of claim 1, wherein the fusible element is absorbed upwards and downwards when the fusible element is blown.

3. The protection device of claim 1, further comprising an insulating frame disposed on the second surface to accumulate flux on the top of the fusible element.

4. The protection device of claim 3, wherein the insulating frame comprises an outer frame and an inner frame, the inner frame confines the flux, and the outer frame confines the posts made by silver adhesive and solder paste.

5. The protection device of claim 1, wherein a gap is between the fusible element and the absorbent element, and the gap is able to incur absorption.

6. The protection device of claim 5, wherein the gap is filled with solder to connect the fusible element and the absorbent element.

7. The protection device of claim 1, wherein the protection device has a thickness ranging from 0.2-2 mm.

8. The protection device of claim 1, further comprising an insulating layer between the fusible element and the heating element for isolation.

9. The protection device of claim 1, further comprising a third electrode and a fourth electrode on the first surface, and the third electrode and the fourth electrode connect to two ends of the heating element.

10. The protection device of claim 9, wherein the heating element is of a rectangular shape, and the third electrode and the fourth electrode connect to two longitudinal ends of the heating element.

11. The protection device of claim 9, further comprising an electrode layer which connects to a middle portion of the underside of the fusible element and electrically connects to the third electrode.

12. The protection device of claim 11, wherein the fusible element and the heating element form an equivalent circuit comprising two fuses and a heater.

13. A circuit protection apparatus, comprising:
a protection device, comprising:
   a first planar substrate comprising a first surface;
   a second planar substrate comprising a second surface facing the first surface;
   a heating element disposed on the first surface;
   a fusible element disposed above the heating element;
   a first electrode and a second electrode disposed on the first surface and on a same plane with the heating element, and the fusible element electrically connecting to the first electrode and the second electrode at two ends; and
   an absorbent element disposed on the second surface and above the fusible element; and
a detector senses a voltage drop or a temperature of a circuit to be protected; and
a switch coupled to the detector to receive signals of the detector;
wherein the first planar substrate and the second planar substrate are combined by posts made by silver adhesive and solder paste, and the posts made by silver adhesive and solder paste are in direct contact with the second surface;
wherein the switch turns on to allow current to flow through the heating element by which the heating element heats up to blow the fusible element and the absorbent element absorbs melted metal of the fusible element when the detector senses the voltage drop or the temperature exceeding a threshold value.

14. The circuit protection apparatus of claim 13, wherein the fusible element is absorbed upwards and downwards when the fusible element is blown.

15. The circuit protection apparatus of claim 13, wherein the detector and the switch are disposed on the first surface.

* * * * *